(12) United States Patent
Maeda et al.

(10) Patent No.: US 11,691,556 B2
(45) Date of Patent: Jul. 4, 2023

(54) VEHICLE RAMP SYSTEM

(71) Applicants: TOYOTA JIDOSHA KABUSHIKI KAISHA, Aichi-ken (JP); AISIN SEIKI KABUSHIKI KAISHA, Aichi-ken (JP)

(72) Inventors: Hideki Maeda, Toyota (JP); Shunsuke Kanagai, Anjo (JP); Masaaki Tanaka, Toyota (JP); Isao Honda, Kariya (JP); Taiki Ishiguro, Kariya (JP); Tomoyuki Kato, Kariya (JP); Takeshi Nishikibe, Kariya (JP); Dai Hidaka, Kariya (JP)

(73) Assignees: TOYOTA JIDOSHA KABUSHIKI KAISHA, Aichi-Ken (JP); AISIN SEIKI KABUSHIKI KAISHA, Aichi-Ken (JP)

( * ) Notice: Subject to any disclaimer, the term of this patent is extended or adjusted under 35 U.S.C. 154(b) by 394 days.

(21) Appl. No.: 17/135,808

(22) Filed: Dec. 28, 2020

(65) Prior Publication Data

US 2021/0245649 A1    Aug. 12, 2021

(30) Foreign Application Priority Data

Feb. 12, 2020    (JP) ................................. 2020-021818

(51) Int. Cl.
*G06F 17/00* (2019.01)
*B60P 1/43* (2006.01)
(Continued)

(52) U.S. Cl.
CPC ................ *B60P 1/431* (2013.01); *B60Q 5/00* (2013.01); *G06V 20/58* (2022.01); *A61G 3/061* (2013.01);
(Continued)

(58) Field of Classification Search
CPC .......... B60P 1/431; B60Q 5/00; G06V 20/58; A61G 3/061; A61G 3/06; G01G 19/02; G01S 13/04; G01S 17/04; G01S 13/08; G01S 13/931; G01S 17/931; G01S 2013/9314; B60R 3/02; B62D 25/20
(Continued)

(56) References Cited

U.S. PATENT DOCUMENTS 10,179,712 B2 *  1/2019  Vollmar ................. B60P 1/025
11,400,856 B2 *  8/2022  Shitara ..................... G01S 17/86
(Continued)

FOREIGN PATENT DOCUMENTS

JP   2019116112 A    7/2019
JP   2020164142 A   10/2020
WO  WO-2007056431 A2 *  5/2007  ............ A61G 3/061

OTHER PUBLICATIONS

Vehicle Ramp Assembly (Year: 2005).*
Ramp assembly with tilt sensor (Year: 2013).*
Vehicle lifts and ramps (Year: 2003).*

*Primary Examiner* — Ronnie M Mancho
(74) *Attorney, Agent, or Firm* — Hauptman Ham, LLP (57) ABSTRACT

A ramp system for a vehicle includes a control device. Using an obstacle detection device, the control device determines whether an obstacle exists within a ramp extension area. Upon determining that an obstacle exists within the ramp extension area, the control device causes a vehicle to move to a location in which no obstacle exists within the ramp extension area.

6 Claims, 6 Drawing Sheets

(51) Int. Cl.
　　　*B60Q 5/00*　　　(2006.01)
　　　*G06V 20/58*　　(2022.01)
　　　*G01S 17/04*　　　(2020.01)
　　　*A61G 3/06*　　　　(2006.01)
　　　*G01G 19/02*　　　(2006.01)
　　　*G01S 13/04*　　　(2006.01)

(52) U.S. Cl.
　　　CPC .............. *G01G 19/02* (2013.01); *G01S 13/04* (2013.01); *G01S 17/04* (2020.01)

(58) Field of Classification Search
　　　USPC .......................................................... 701/23
　　　See application file for complete search history.

(56) References Cited

U.S. PATENT DOCUMENTS

| | | | |
|---|---|---|---|
| 2009/0274542 A1* | 11/2009 | Pocobello .............. | A61G 3/067 |
| | | | 414/522 |
| 2018/0044124 A1* | 2/2018 | Vollmar ................. | B65G 69/24 |
| 2018/0095473 A1* | 4/2018 | Fakhfakh .......... | B60W 30/0956 |
| 2019/0193620 A1* | 6/2019 | Matsuoka ............. | B60K 7/0007 |
| 2019/0265703 A1* | 8/2019 | Hicok .................. | G05D 1/0088 |
| 2020/0113755 A1* | 4/2020 | Seko ....................... | H04M 1/04 |
| 2020/0122642 A1* | 4/2020 | Sato ....................... | A61G 3/061 |
| 2020/0155385 A1* | 5/2020 | Darnaud ................ | B60P 1/435 |
| 2021/0245649 A1* | 8/2021 | Maeda ................... | B60P 1/431 |

\* cited by examiner

VEHICLE RAMP SYSTEM

CROSS-REFERENCE TO RELATED APPLICATION

This application claims priority to Japanese Patent Application No. 2020-021818 filed on Feb. 12, 2020, incorporated herein by reference in its entirety.

BACKGROUND

1. Technical Field

The present disclosure relates to a vehicle ramp system.

2. Description of Related Art

Japanese Unexamined Patent Application Publication No. 2019-116112 discloses a technology relating to a ramp device for an autonomous vehicle. In this technology, the ramp device checks presence and absence of a sidewalk using a camera mounted on a vehicle, calculates a height difference and distance between a road or sidewalk at a boarding and exiting place of a passenger, such as a bus stop, and the floor of the vehicle, adjusts an angle at which a ramp is fed, and feeds out the ramp to the outside of the vehicle.

SUMMARY

However, in the related art, when an obstacle (including a person) exists on the road or sidewalk, it is difficult to calculate the height difference and distance between the road or sidewalk and the floor of the vehicle, and it may be impossible to extend the ramp. Therefore, in this respect, there is room for further improvement.

The present disclosure provides a vehicle ramp system that enables a ramp to be extended even when an obstacle exists at a boarding and exiting place of a passenger.

A vehicle ramp system according to an aspect of the present disclosure includes a ramp extension and storage mechanism configured to extend and store a ramp that enables a passenger to move into and out of the vehicle, an obstacle detection device configured to, when the vehicle is stopped at a predetermined place, detect whether an obstacle exists within a ramp extension area in which the ramp is to be extended, and a control device set to, upon determining that no obstacle exists within the ramp extension area based on a detection result of the obstacle detection device, cause the ramp extension and storage mechanism to extend the ramp, and upon determining that an obstacle exists within the ramp extension area based on the detection result of the obstacle detection device, cause the vehicle to move to a location in which no obstacle exists within the ramp extension area.

In the above configuration, the ramp extension and storage mechanism, the obstacle detection device, and the control device are included. The ramp extension and storage mechanism can extend and store the ramp that enables a passenger to move into and out of the vehicle. Further, when the vehicle is stopped at the predetermined place, the obstacle detection device detects whether an obstacle exists within the ramp extension area in which the ramp is to be extended.

Then, upon determining that no obstacle exists within the ramp extension area based on the detection result of the obstacle detection device, the control device causes the ramp extension and storage mechanism to extend the ramp. On the other hand, upon determining that an obstacle exists within the ramp extension area based on the detection result of the obstacle detection device, the control device causes the vehicle to move to a location in which no obstacle exists within the ramp extension area.

In other words, in the above aspect, even when an obstacle exists at the boarding and exiting place of a passenger, it is possible to extend the ramp by causing the vehicle to move to a location in which no obstacle exists.

In the above aspect, the "predetermined place" refers to a bus stop or a boarding and exiting place designated in advance by a passenger. In addition, in the above aspect, the "obstacle" includes a person as well as an object.

In the above aspect, the vehicle may include a voice alarm device configured to emit voice. Upon determining that an obstacle exists within the ramp extension area based on the detection result of the obstacle detection device, the control device may cause the voice alarm device to emit voice before causing the vehicle to move. After the voice is emitted, upon determining that no obstacle exists within the ramp extension area based on the detection result of the obstacle detection device, the control device may cause the ramp extension and storage mechanism to extend the ramp, and upon determining that an obstacle exists within the ramp extension area based on the detection result of the obstacle detection device, the control device may cause the vehicle to move to a location in which no obstacle exists within the ramp extension area.

In the above configuration, the vehicle includes the voice alarm device that emits voice. Upon determining that an obstacle exists within the ramp extension area based on the detection result of the obstacle detection device, the control device causes the voice alarm device to emit voice before causing the vehicle to move.

For example, when the obstacle is a person, by emitting voice, such as an announcement, using the voice alarm device, it is possible to prompt the person to move. Therefore, the above configuration has an effect of being capable of causing, using voice, the person to leave the ramp extension area. As such, after the voice alarm device emits the voice, upon determining that no obstacle exists within the ramp extension area based on the detection result of the obstacle detection device, the control device causes the ramp extension and storage mechanism to extend the ramp.

On the other hand, after the voice alarm device emits the voice, upon determining that an obstacle exists within the ramp extension area based on the detection result of the obstacle detection device, the control device causes the vehicle to move to a location in which no obstacle exists within the ramp extension area.

In the above aspect, as the obstacle detection device, at least one of a camera, a millimeter-wave radar, and a Laser Imaging Detection and Ranging (LIDAR) may be used.

In the above configuration, as the obstacle detection device, at least one of the camera, the millimeter-wave radar, and the LIDAR is used. The camera captures an image of a situation of the outside of the vehicle. As such, it is possible to check whether an obstacle exists. Moreover, the millimeter-wave radar and the LIDAR measure a distance from the vehicle to an obstacle. The above configuration has an effect of being capable of confirming, using the above devices, the safety including whether an obstacle exists within the ramp extension area.

In the above aspect, the ramp extension and storage mechanism may include a drive motor configured to cause the ramp to be extended and stored. The control device may be set to, when a current value or rotation speed of the drive motor changes, cause the driving of the drive motor to be stopped.

In the above configuration, the drive motor that causes the ramp to be extended and stored is provided in the ramp extension and storage mechanism. When the current value or rotation speed of the drive motor changes, the control device is set to cause the driving of the drive motor to be stopped.

For example, when a tip of the ramp touches the sidewalk or ground, the current value or rotation speed changes. In such a case, the control device can cause the driving of the drive motor to be stopped, such that an operation of the ramp extension is completed. In other words, the above configuration has an effect of being capable of confirming completion of the operation of the ramp extension by stopping the driving of the drive motor.

In the above aspect, the vehicle may further include a vehicle weight detection device configured to detect a weight of the vehicle. The control device may be set to, when a predetermined time has elapsed since no change in the weight of the vehicle was determined after the extension of the ramp based on a detection result of the vehicle weight detection device, cause the ramp extension and storage mechanism to store the ramp.

In the above configuration, when a predetermined time has elapsed since no change in the weight of the vehicle was determined after the extension of the ramp, the control device stores the ramp. Therefore, in the above configuration, because the ramp is stored when the predetermined time has elapsed since no change in the weight of the vehicle was determined after the extension of the ramp, the ramp will not be stored until a passenger completes boarding or exiting. In other words, in the above configuration, the operation of the ramp storage is started after it is confirmed that a passenger has completed boarding or exiting. In other words, the above configuration has an effect of ensuring the safety of a passenger because the operation of the ramp storage is started after it is confirmed that a passenger has completed boarding or exiting.

In the above aspect, the vehicle may further include an extension and storage button. When the extension and storage button is pressed, the control device may be set to cause the ramp extension and storage mechanism to extend or store the ramp.

In the above configuration, the vehicle further includes the extension and storage button. When the extension and storage button is pressed, the control device drives the drive motor of the ramp extension and storage mechanism, such that the ramp is extended or stored. Therefore, the above configuration has an effect of being capable of manually executing the operation of the ramp extension or storage by a pressing of the extension and storage button.

As described above, the vehicle ramp system according to the aspect of the present disclosure has an effect of being capable of extending a ramp even when an obstacle exists at a boarding and exiting place of a passenger.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle ramp system according to an embodiment of the present disclosure will be described with reference to the drawings. In each drawing, arrows are appropriately illustrated. More specifically, an arrow UP represents the upper side in the vehicle longitudinal direction, an arrow FR represents the front side in the seat front-rear direction, and an arrow RH represents the right side in the seat width direction. In addition, in the following description, when the front-rear, longitudinal, and right-left directions are used without a special mention, they indicate front and rear in the seat front-rear direction, up and down in the vehicle longitudinal direction, and right and left when facing the traveling direction, respectively.

Configuration of Vehicle Ramp System

First, a configuration of the vehicle ramp system according to the present embodiment will be described.

Figure 1:
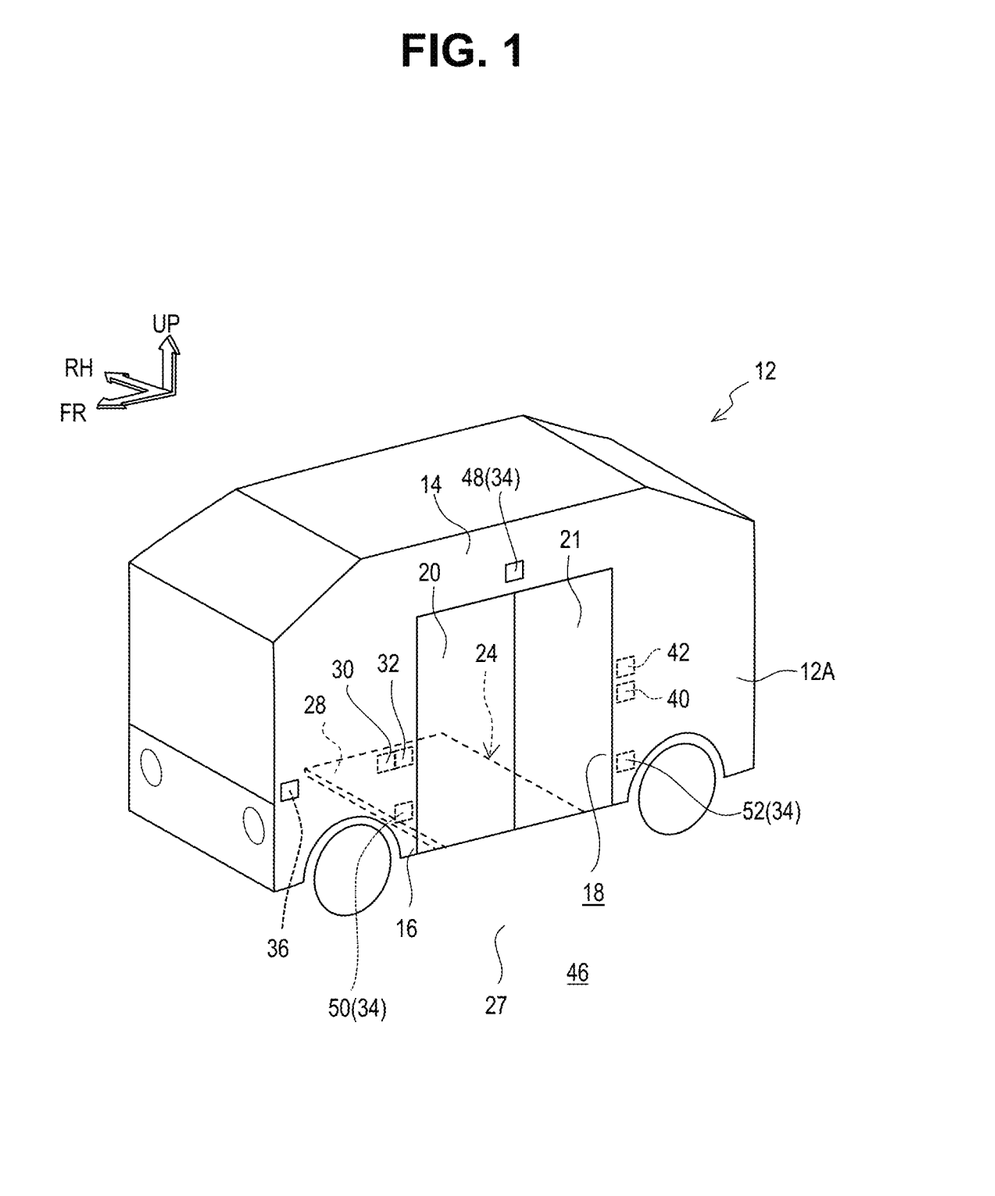
FIG. 1 is a perspective view illustrating a state where a ramp is stored in a vehicle including a vehicle ramp system according to an embodiment of the present disclosure, when viewed diagonally from the left front side of the vehicle.
Figure 2:
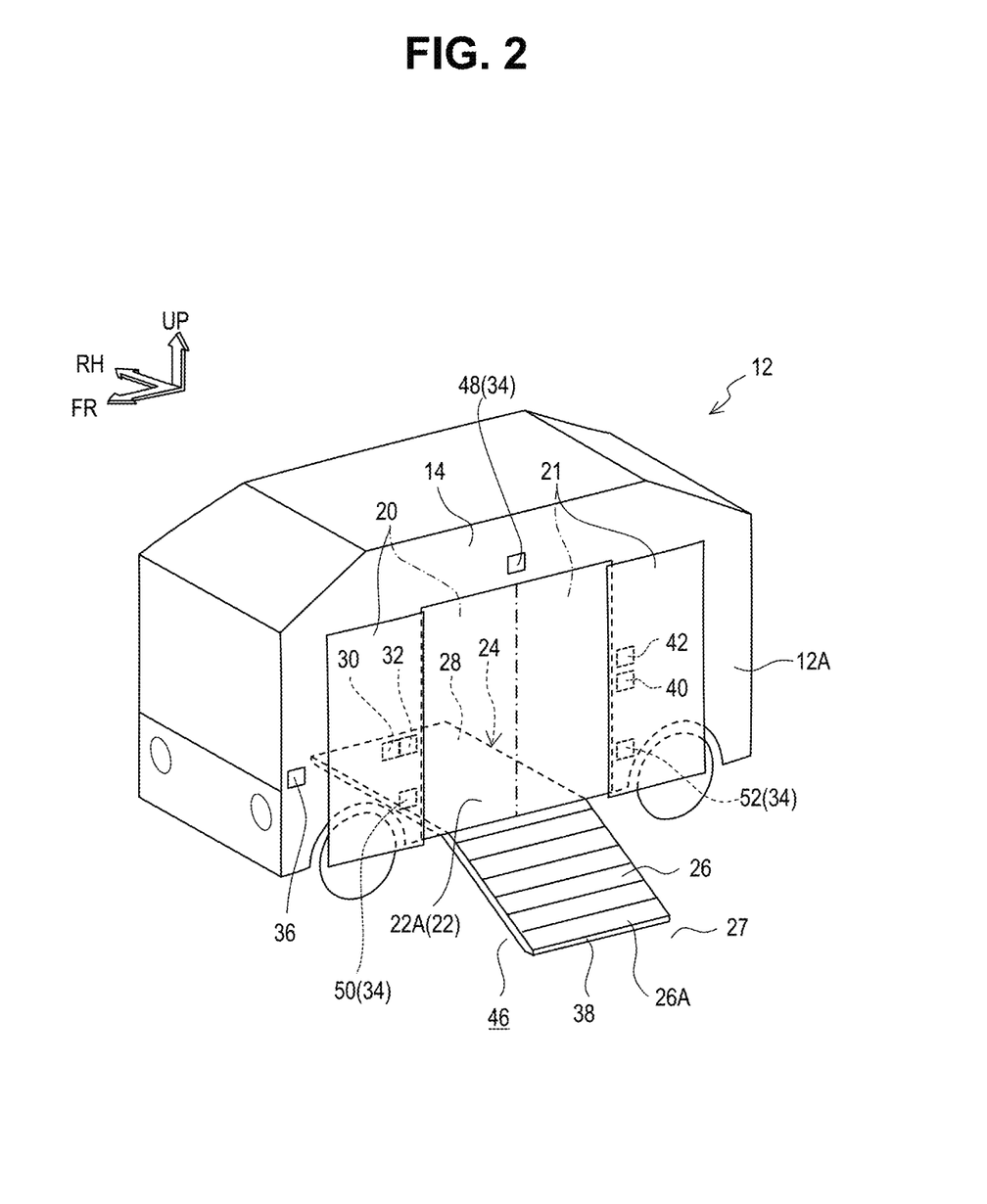
FIG. 2 is a perspective view illustrating a state where the ramp is extended from the vehicle including the vehicle ramp system according to the present embodiment, when viewed diagonally from the left front side of the vehicle.

Each of FIGS. 1 and 2 illustrates a perspective view of a vehicle 12 including a vehicle ramp system 10 (see FIG. 4) according to the present embodiment. The vehicle 12 illustrated in FIGS. 1 and 2 is an electrically driven vehicle that travels by autonomous driving, and can also travel by remote control.

As illustrated in FIGS. 1 and 2, in a left side portion 12A of the vehicle 12, a rectangular opening 18 is formed from the upper portion 14 side to a lower end portion 16 of the vehicle 12 at the center of the left side portion 12A in the vehicle front-rear direction. The opening 18 can be opened and closed by a pair of doors 20, 21 that slides along the vehicle front-rear direction.

Here, FIG. 1 illustrates the vehicle 12 in a state where the doors 20, 21 are closed and a ramp 26 to be described below is stored. FIG. 2 illustrates the vehicle 12 in a state where the doors 20, 21 are open and the ramp 26 is extended.

As illustrated in FIG. 2, in the state where the doors 20, 21 are open, the door 20 is arranged on the outer side of the left side portion 12A of the vehicle 12 in the vehicle width direction ahead of the opening 18 in the vehicle front-rear direction, and the door 21 is arranged on the outer side of the left side portion 12A of the vehicle 12 in the vehicle width direction behind the opening 18 in the vehicle front-rear direction.

Moreover, a floor surface 22A of a floor portion 22 of the vehicle 12 is entirely flat, and a ramp device (a ramp extension/storage mechanism) 24 is provided on the lower side of the floor portion 22 at the center of the floor portion 22 in the vehicle front-rear direction. The ramp device 24 includes, for example, a rectangular plate-shaped ramp 26, a storage unit 28, and a drive motor 30.

The storage unit 28 is fixed on the back surface side of the floor portion 22, and the ramp 26 can be stored inside the storage unit 28. The width dimension of the ramp 26 is formed to be slightly shorter than that of the opening 18, and the ramp can move along the vehicle width direction by a driving of the drive motor 30 arranged in an inner portion of the storage unit 28.

Figure 3:
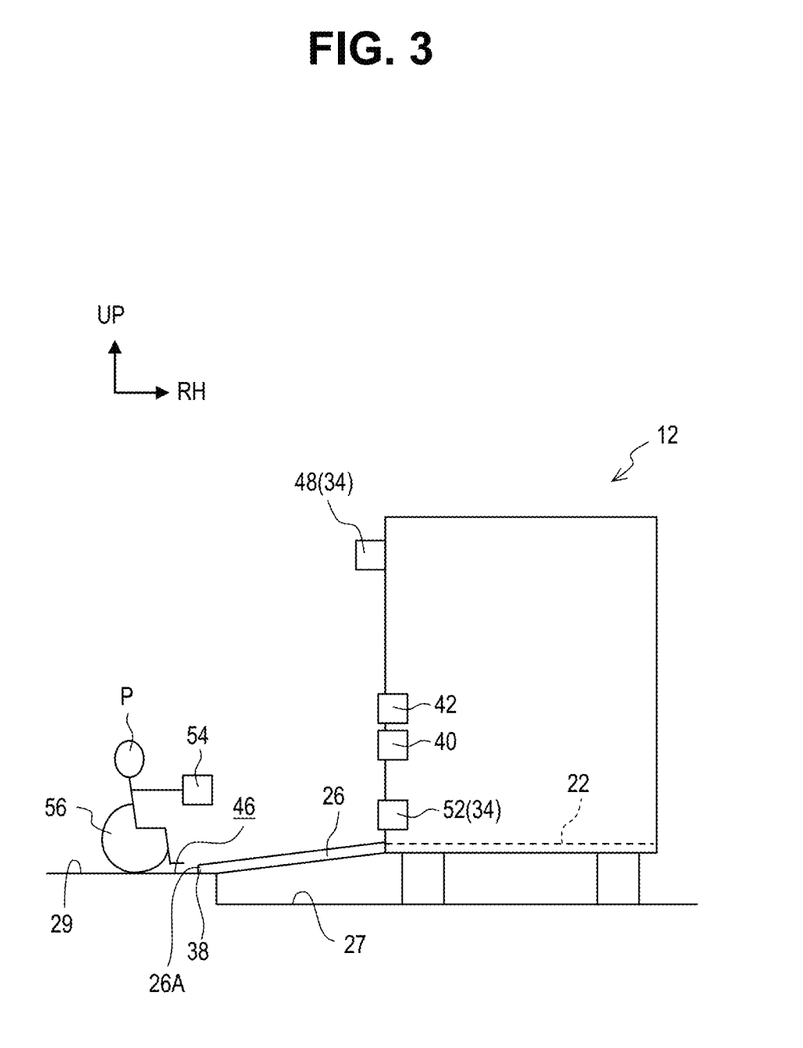
FIG. 3 is a rear view illustrating a state where the ramp is extended from the vehicle including the vehicle ramp system according to the present embodiment, when viewed from the rear side of the vehicle.

As illustrated in FIG. 1, when the drive motor 30 is driven in a state where the ramp 26 is stored inside the storage unit 28, as illustrated in FIGS. 2 and 3, the ramp 26 moves outward in the vehicle width direction and is extended to the outside of the vehicle.

Here, although not shown, a shaft portion having a line, as a shaft line, along the vehicle front-rear direction is provided in the rear end portion of the ramp 26 in the extending direction. As illustrated in FIG. 2, when the ramp 26 is fed out from the storage unit 28, a tip 26A of the ramp 26 becomes rotatable downward around the shaft portion.

In other words, when there is a height difference between the floor surface 22A of the floor portion 22 of the vehicle 12 and a sidewalk 29 or ground 27 (see FIG. 3), the ramp 26, in the extended state, inclines downward as it goes toward the sidewalk 29 or ground 27 side.

FIG. 3 is a rear view of the vehicle 12 illustrating a state where the floor portion 22 of the vehicle 12 and the sidewalk 29 are bridged by the ramp 26, when viewed from the vehicle rear side. As illustrated in FIG. 3, the floor portion 22 of the vehicle 12 and the sidewalk 29 are bridged by the ramp 26, such that the vehicle 12 can become barrier-free.

As illustrated in FIGS. 2 and 3, when the drive motor 30 is driven in the state where the ramp 26 is extended, the ramp 26 moves toward the vehicle 12, and, as illustrated in FIG. 1, is stored in the storage unit 28.

The ramp 26 may be composed of one or a plurality of sheets. When the ramp 26 is composed of a plurality of sheets, the sheets can be stacked in the vehicle longitudinal direction. Therefore, the space occupied by the storage unit 28 can be reduced, when viewed in a plan view.

Figure 4:
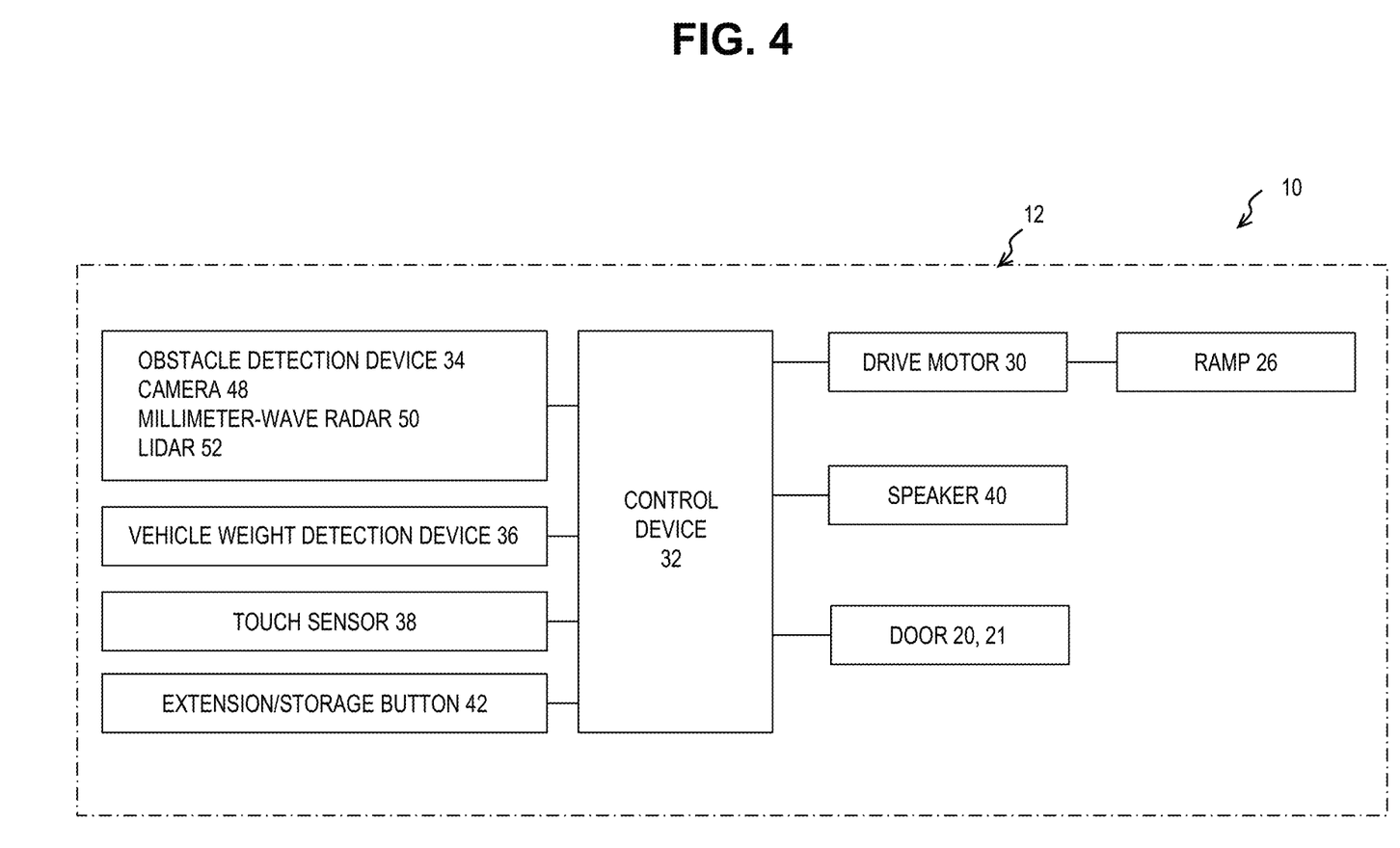
FIG. 4 is a block diagram illustrating a configuration of the vehicle ramp system according to the present embodiment.

Here, FIG. 4 is a block diagram illustrating a configuration of the vehicle ramp system 10 according to the present embodiment.

As illustrated in FIG. 4, in the present embodiment, the vehicle 12 includes a control device 32. Further, the vehicle 12 includes an obstacle detection device 34, a vehicle weight detection device 36, a touch sensor 38, a speaker 40, and an extension/storage button 42. These devices are respectively connected to the control device 32 via an input/output interface (not shown).

When the vehicle 12 is stopped at a predetermined boarding/exiting place of a passenger, such as a bus stop or a place designated in advance by a passenger, the obstacle detection device 34 detects whether an obstacle exists within a ramp extension area 46 in which the ramp 26 is to be extended (see FIG. 1).

As the obstacle detection device 34, a camera 48 that captures images of a specified range, a millimeter-wave radar 50 that transmits exploration waves to a specified range, and a Laser Imaging Detection and Ranging (LIDAR) 52 that scans a specified range may be used. In addition to the above devices, an ultrasonic sensor or the like may be used as long as it can detect whether an obstacle exists.

Here, as illustrated in FIG. 1, the camera 48 may be provided on, for example, the upper side of the opening 18 formed in the left side portion 12A of the vehicle 12, and, captures images of the situation outside the vehicle 12 to acquire image capturing information. The camera 48 may be a monocular camera but may also be a stereo camera. This is because the stereo camera has two image capturing units arranged so as to reproduce binocular parallax, and the image capturing information of the stereo camera also includes information on the depth direction.

Further, the millimeter-wave radar 50 may be provided in, for example, the lower portion ahead of the opening 18 in the vehicle front-rear direction, which is formed in the left side portion 12A of the vehicle 12, and detects an obstacle and measures a distance from the vehicle 12 to the obstacle by transmitting radio waves (for example, millimeter-waves) around the vehicle 12 and receiving the radio waves reflected by the obstacle.

Moreover, the LIDAR 52 may be provided in, for example, the lower portion behind the opening 18 in the vehicle front-rear direction, which is formed in the left side portion 12A of the vehicle 12, and detects an obstacle and measures a distance from the vehicle 12 to the obstacle by transmitting light around the vehicle 12 and receiving the light reflected by the obstacle.

The obstacle detection device 34 includes at least one of the camera 48, the millimeter-wave radar 50, and the LIDAR 52.

Meanwhile, the vehicle weight detection device 36 detects the weight of the vehicle. The vehicle weight detection device 36 is connected to the floor portion 22 of the vehicle 12 and can detect the weight of the vehicle by detecting the weight applied to the floor portion 22. As such, it is possible to recognize the boarding/exiting situation of a passenger.

In addition, as illustrated in FIGS. 2 and 3, the touch sensor 38 is provided at the tip 26A of the ramp 26 in the extending direction. When the touch sensor 38 touches the sidewalk 29 or ground 27, a signal is transmitted to the control device 32 and the driving of the drive motor 30 is stopped by the control device 32, such that the extended state of the ramp 26 is maintained.

Further, as illustrated in FIG. 1, the speaker 40 emits voice, and is provided near the center in the longitudinal direction and behind the door 21 of the vehicle 12. When an obstacle exists within the ramp extension area 46, an announcement is made through the speaker 40 before the ramp 26 is extended.

Moreover, the extension/storage button 42 is used for causing the ramp 26 to be extended or stored. The extension/storage button 42 may be provided, for example, above the speaker 40. As illustrated in FIG. 1, when the extension/storage button 42 is pressed in the state where the ramp 26 is stored, a signal is transmitted to the control device 32 and the drive motor 30 is driven by the control device 32, such that the ramp 26 is extended.

On the other hand, as illustrated in FIG. 2, when the extension/storage button 42 is pressed in the state where the ramp 26 is extended, a signal is transmitted to the control device 32 and the drive motor 30 is driven by the control device 32, such that the ramp 26 is stored.

In addition, the control device 32 includes a receiving unit (not shown). As illustrated in FIG. 3, the receiving unit can receive a signal from a mobile device 54, such as a smartphone, owned by a user P who summons the vehicle 12.

For example, when the user P summons the vehicle 12, the mobile device 54 is used. When necessary items are input to the mobile device 54, a signal of the input information is received to the receiving unit of the control device 32 via a base station (not shown), a network (not shown), or the like. Therefore, when information indicating that "barrier-free desired" is input to the mobile device 54, the control device 32 determines that the user P requires the ramp 26 when boarding/exiting the vehicle 12.

Action and Effect of Vehicle Ramp System

Next, an action and an effect of the vehicle ramp system according to the present embodiment will be described.

Figure 5:
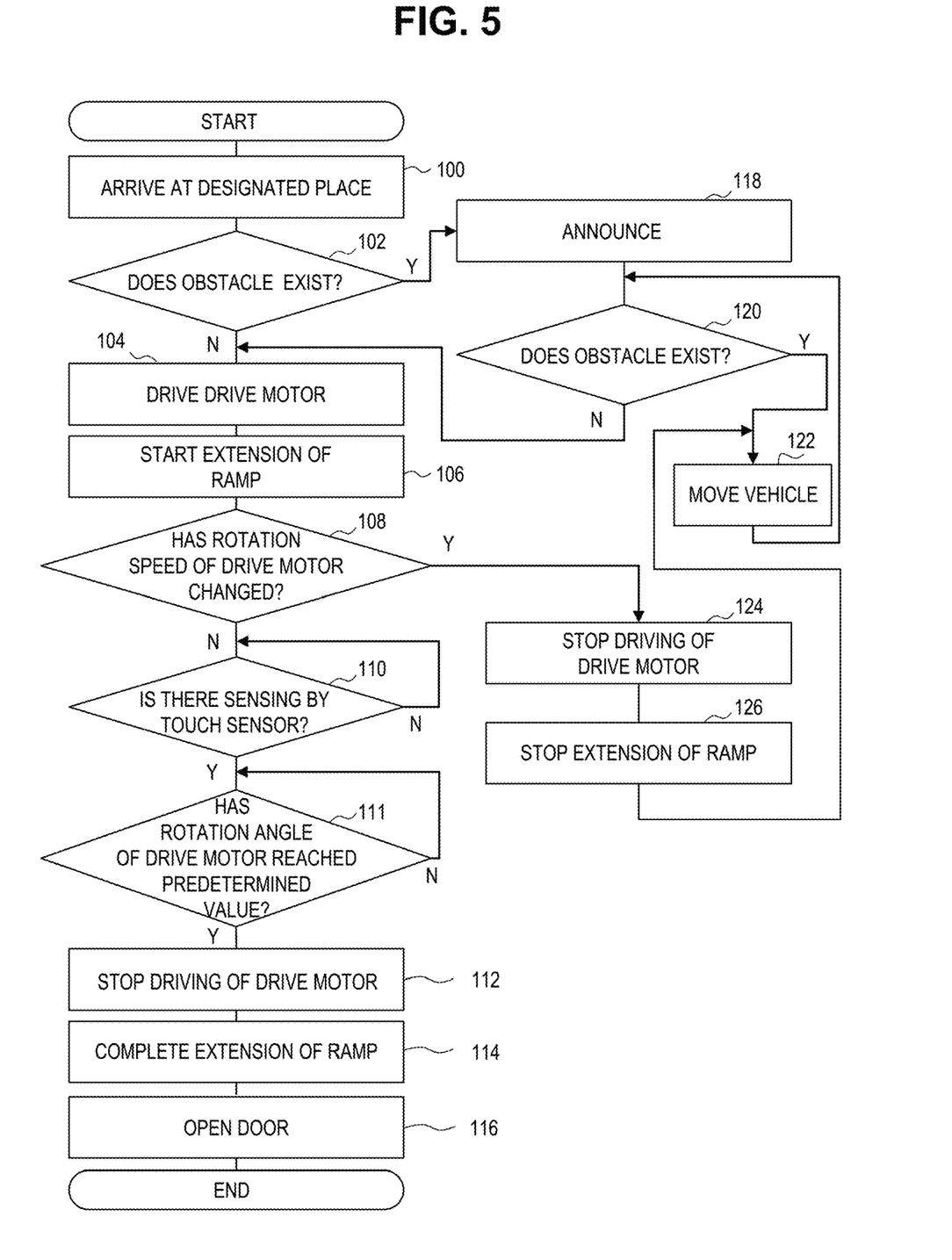
FIG. 5 is a flowchart describing a flow of processing until the ramp is extended from the vehicle including the vehicle ramp system according to the present embodiment.
Figure 6:
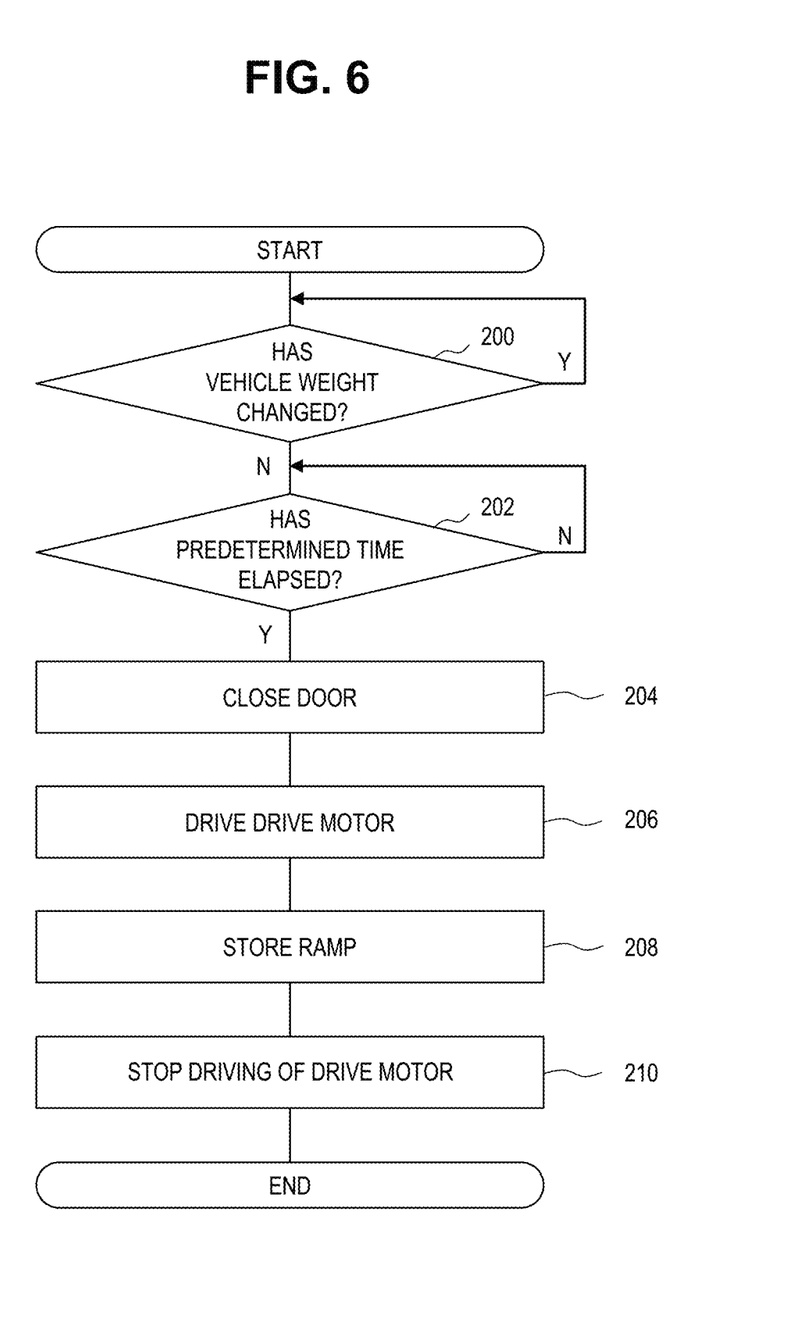
FIG. 6 is a flowchart describing a flow of processing until the ramp is stored in the vehicle including the vehicle ramp system according to the present embodiment.

The vehicle ramp system 10 according to the present embodiment will be described with reference to FIGS. 1 and 2, and flowcharts illustrated in FIGS. 5 and 6. FIG. 5 is a flowchart describing a flow of processing until the ramp 26 provided in the vehicle 12 is extended, and FIG. 6 is a flowchart describing a flow of processing until the ramp 26 is stored in the storage unit 28 of the vehicle 12.

Extension of Ramp

First, the time when the ramp 26 is extended will be described.

As illustrated in FIGS. 1 and 5, in step 100, when the vehicle 12 has arrived at a designated place, the control device 32 proceeds to step 102. In step 102, using the obstacle detection device 34, the control device 32 determines whether an obstacle exists within the ramp extension area 46, which is a boarding/exiting place of a passenger. In other words, in step 102, whether an obstacle exists within the ramp extension area 46 is checked.

In step 102, upon determining that no obstacle exists within the ramp extension area 46, the control device 32 proceeds to step 104. Then, in step 104, the control device 32 causes the drive motor 30 that causes the ramp 26 to move to be driven.

Thereafter, in step 106, as illustrated in FIG. 2, the extension of the ramp 26 within the ramp extension area 46 is started. In other words, in the present embodiment, when no obstacle exists within the ramp extension area 46, the ramp 26 can be extended.

Next, in step 108, the control device 32 determines whether rotation speed of the drive motor 30 has changed. In other words, in step 108, whether the rotation speed of the drive motor 30 has changed is checked. The rotation speed of the drive motor 30 is rotation speed thereof per unit time.

Then, in step 108, upon determining that the rotation speed of the drive motor 30 has not changed, the control device 32 proceeds to step 110. In step 110, the control device 32 determines whether there is a sensing by the touch sensor 38.

When there is a sensing by the touch sensor 38, it is recognized that the tip 26A of the ramp 26 has touched the sidewalk 29 or ground 27. Therefore, in step 110, whether there is a sensing by the touch sensor 38 is checked. In step 110, the control device 32 repeatedly executes this processing until there is a sensing by the touch sensor 38.

In step 110, upon determining that there is a sensing by the touch sensor 38, the control device 32 proceeds to step 111. Then, in step 111, the control device 32 determines whether a rotation angle of the drive motor 30 has reached a predetermined value. The rotation angle of the drive motor 30 is a rotation angle accumulated from the start of rotation of the drive motor 30.

In other words, in step 111, whether the ramp 26 has been definitely extended is confirmed. In step 111, the control device 32 repeatedly executes this processing until the rotation angle of the drive motor 30 reaches the predetermined value.

Only with the sensing by touch sensor 38, it is assumed that the tip 26A of the ramp 26 has come into contact with an obstacle that has separately entered the ramp extension area 46. Therefore, in the present embodiment, in addition to the sensing by the touch sensor 38 in step 110, the control device 32 determines in step 111 that the rotation angle of the drive motor 30 has reached the predetermined value, such that it is recognized that the tip 26A of the ramp 26 has definitely touched the sidewalk 29 (see FIG. 3) or ground 27.

Then, in step 111, upon determining that the rotation angle of the drive motor 30 has reached the predetermined value, the control device 32 proceeds to step 112.

In step 112, the control device 32 causes the driving of the drive motor 30 to be stopped, and then proceeds to step 114. Next, in step 114, the extension of the ramp 26 within the ramp extension area 46 is completed, and the ramp 26 becomes usable.

Then, the control device 32 proceeds to step 116. In step 116, the control device 32 causes the door 20 to be opened. Accordingly, a passenger aboard the vehicle 12 can exit the vehicle 12 via the ramp 26, and a passenger outside the vehicle can board the vehicle 12 via the ramp 26. As such, by using the ramp 26, as illustrated in FIG. 3, a passenger sitting in a wheelchair 56 or a passenger with a disability can easily board/exit the vehicle 12 because there is no step.

However, in the present embodiment, in step 102, upon determining that an obstacle exists, the control device 32 proceeds to step 118. In step 118, the control device 32 makes an announcement (notification) through the speaker 40. As such, when the obstacle is a person, by making an announcement, it is possible to prompt the person to move so as to cause the person to leave the ramp extension area 46.

Then, the control device 32 proceeds to step 120. In step 120, using the obstacle detection device 34, the control device 32 again determines whether an obstacle exists within the ramp extension area 46. In step 120, upon determining that no obstacle exists within the ramp extension area 46, the control device 32 proceeds to step 104.

In other words, the control device 32 causes the drive motor 30 that causes the ramp 26 to move to be driven, and in step 106, the extension of the ramp 26 within the ramp extension area 46 is started.

On the other hand, in step 120, upon determining that an obstacle exists within the ramp extension area 46, the control device 32 proceeds to step 122. In step 122, the control device 32 causes the vehicle 12 to move to a location in which no obstacle exists within the ramp extension area 46.

In other words, in the present embodiment, even when an obstacle exists at a boarding/existing place of a passenger, it is possible to extend the ramp 26 by causing the vehicle 12 to move to a location in which no obstacle exists.

Then, in step 122, after causing the vehicle 12 to move to a location in which no obstacle exists within the ramp extension area 46, the control device 32 proceeds to step 120. Thereafter, using the obstacle detection device 34, the control device 32 again determines whether an obstacle exists within the ramp extension area 46.

Here, in the present embodiment, in step 102, upon determining that an obstacle exists, the control device 32 proceeds to step 118, in which it makes an announcement through the speaker 40. However, step 118 is not necessarily required.

In other words, an announcement does not have to be made. When an announcement is not made, in step 102, upon determining that an obstacle exists, the control device 32 proceeds to step 122 and causes the vehicle 12 to move to a location in which no obstacle exists within the ramp extension area 46.

Meanwhile, in step 108, upon determining that the rotation speed of the drive motor 30 has changed, the control device 32 proceeds to step 124. In step 108, the rotation speed of the drive motor 30 changes when, for example, the ramp 26 comes into contact with an obstacle.

Therefore, in step 124, the control device 32 causes the driving of the drive motor 30 that causes the ramp 26 to move to be stopped. Then, the control device 32 proceeds to step 126. In step 126, the extension of the ramp 26 is stopped, and then the control device 32 proceeds to step 122. Then, in step 122, the control device 32 causes the vehicle 12 to move to a location in which no obstacle exists within the ramp extension area 46.

As described above, in the present embodiment, upon determining that no obstacle exists within the ramp extension area 46 based on the detection result of the obstacle detection device 34, the control device 32 causes the ramp 26 to be extended.

On the other hand, upon determining that an obstacle exists within the ramp extension area 46 based on the detection result of the obstacle detection device 34, the control device 32 causes the vehicle 12 to move to a location in which no obstacle exists within the ramp extension area 46.

In other words, in the present embodiment, when no obstacle exists at a boarding/exiting place of a passenger, the control device 32 causes the ramp 26 to be extended. On the other hand, when an obstacle exists at a boarding/exiting place of a passenger, the control device 32 causes the vehicle 12 to move to a location in which no obstacle exists, such that the ramp 26 can be extended. Consequently, in the present embodiment, even when an obstacle exists at a boarding/exiting place of a passenger, it is possible to extend the ramp 26.

Further, in the present embodiment, since the control device 32 causes the ramp 26 to be automatically extended, it is possible to contribute to making the vehicle 12 automatically barrier-free. As such, it is possible for a passenger sitting in a wheelchair 56 or a passenger with a disability to smoothly board/exit the vehicle 12.

Moreover, as described above, in the present embodiment, since the ramp 26 is automatically extended, when a driver is aboard the vehicle 12, the driver does not have to manually install the ramp 26. Therefore, in the present embodiment, it is possible to reduce the time and labor required for installation of the ramp 26.

Therefore, in the present embodiment, it is not only possible to reduce burden of a caregiver but also possible to enable a passenger sitting in a wheelchair 56 or a passenger with a disability to board/exit the vehicle 12 without his/her caregiver. Consequently, the present embodiment can be applied to autonomous vehicle traveling without a driver.

Further, in the present embodiment, in step 116, the control device 32 causes the door 20 to be opened after the extension of the ramp 26 is completed in step 114. In comparison, for example, when the ramp 26 is extended after the door 20 is opened, a case can be considered where a passenger may use the ramp 26 even when the extension of the ramp 26 has not been completed yet.

However, as described above, in the present embodiment, since the door 20 is opened after the extension of the ramp 26 is completed, such a problem does not occur. In other words, in the present embodiment, the safety of a passenger can be ensured.

In the present embodiment, the vehicle 12 is provided with the extension/storage button 42 used for causing the ramp 26 to be extended or stored. As illustrated in FIG. 1, when the extension/storage button 42 is pressed in the state where the ramp 26 is stored, a signal is transmitted to the control device 32 and the drive motor 30 is driven by the control device 32, such that the ramp 26 is extended. In other words, in the present embodiment, the operation of extending the ramp 26 can also be manually executed.

Storage of Ramp

Next, the time when the ramp 26 is stored will be described.

As illustrated in FIGS. 2 and 6, in step 200, using the vehicle weight detection device 36, the control device 32 determines whether the weight of the vehicle 12 has changed.

In other words, in step 200, when the vehicle weight has not changed, it is confirmed that no passenger has boarded/exited the vehicle 12. Therefore, in step 200, the control device 32 repeatedly executes this processing until the vehicle weight does not change.

In step 200, upon determining that the vehicle weight has not changed, the control device 32 proceeds to step 202. In step 202, the control device 32 determines whether a predetermined time has elapsed.

In other words, in step 202, whether the predetermined time has elapsed since the vehicle weight did not change is checked. Therefore, in step 202, the control device 32 repeatedly executes this processing until a predetermined time elapses after the vehicle weight does not change.

Then, in step 202, upon determining that the predetermined time has elapsed since the vehicle weight did not change, the control device 32 proceeds to step 204. In step 204, the door 20 is closed.

Next, the control device 32 proceeds to step 206, in which it causes the drive motor 30 that causes the ramp 26 to move to be driven. Then, the control device 32 proceeds to step 208, in which the ramp 26 is stored in the storage unit 28. Next, the control device 32 proceeds to step 210. In step 210, the driving of the drive motor 30 is stopped.

Here, in the present embodiment, the control device 32 causes the ramp 26 to be stored after the door 20 is closed. In comparison, for example, when the door 20 is closed after the ramp 26 is stored in the storage unit 28, a case can be considered where the ramp 26 is stored in the state where the door 20 is open. In this case, since the door 20 is open, a passenger aboard the vehicle 12 may try to use the ramp 26.

However, as described above, in the present embodiment, since the ramp 26 is stored after the door 20 is closed, such a problem does not occur. Therefore, in the present embodiment, the safety of a passenger can be ensured.

In the present embodiment, as described above, the vehicle 12 is provided with the extension/storage button 42 used for causing the ramp 26 to be extended and stored. As illustrated in FIG. 2, when the extension/storage button 42 is pressed in the state where the ramp 26 is extended, a signal is transmitted to the control device 32 and the drive motor 30 is driven by the control device 32, such that the ramp 26 is stored. In other words, in the present embodiment, the operation of storing the ramp 26 can also be manually executed.

Although an example of the present disclosure has been described above, the present disclosure is not limited thereto, and, in addition to that, it is needless to say that the present disclosure can be variously modified and implemented without departing from the scope thereof.

What is claimed is:

1. A ramp system for a vehicle, the ramp system comprising:
a ramp extension and storage mechanism configured to extend and store a ramp that enables a passenger to move into and out of the vehicle;

an obstacle detection device configured to, when the vehicle is stopped at a predetermined place, detect whether an obstacle exists within a ramp extension area in which the ramp is to be extended; and a control device set to:
- upon determining that no obstacle exists within the ramp extension area based on a detection result of the obstacle detection device, cause the ramp extension and storage mechanism to extend the ramp; and
- upon determining that an obstacle exists within the ramp extension area based on the detection result of the obstacle detection device, cause the vehicle to move to a location in which no obstacle exists within the ramp extension area.

2. The ramp system according to claim 1, wherein:
the vehicle includes a voice alarm device configured to emit voice, and
the control device is set to:
- upon determining that an obstacle exists within the ramp extension area based on the detection result of the obstacle detection device, cause the voice alarm device to emit voice before causing the vehicle to move; and
- after the voice is emitted, upon determining that no obstacle exists within the ramp extension area based on the detection result of the obstacle detection device, cause the ramp extension and storage mechanism to extend the ramp, and upon determining that an obstacle exists within the ramp extension area based on the detection result of the obstacle detection device, cause the vehicle to move to the location where no obstacle exists within the ramp extension area.

3. The ramp system according to claim 1, wherein, as the obstacle detection device, at least one of a camera, a millimeter-wave radar, and a Laser Imaging Detection and Ranging is used.

4. The ramp system according to claim 1, wherein:
the ramp extension and storage mechanism includes a drive motor configured to cause the ramp to be extended and stored; and
the control device is set to, when a current value or rotation speed of the drive motor changes, cause driving of the drive motor to be stopped.

5. The ramp system according to claim 1, wherein:
the vehicle further includes a vehicle weight detection device configured to detect a weight of the vehicle; and
the control device is set to, when a predetermined time has elapsed since no change in the weight of the vehicle was determined after an extension of the ramp based on a detection result of the vehicle weight detection device, cause the ramp extension and storage mechanism to store the ramp.

6. The ramp system according to claim 1, wherein:
the vehicle further includes an extension and storage button; and
the control device is set to, when the extension and storage button is pressed, cause the ramp extension and storage mechanism to extend or store the ramp.

* * * * *